Jan. 4, 1938.  S. RODNICK  2,104,529
COOKY MACHINE
Filed Dec. 17, 1936  3 Sheets-Sheet 1
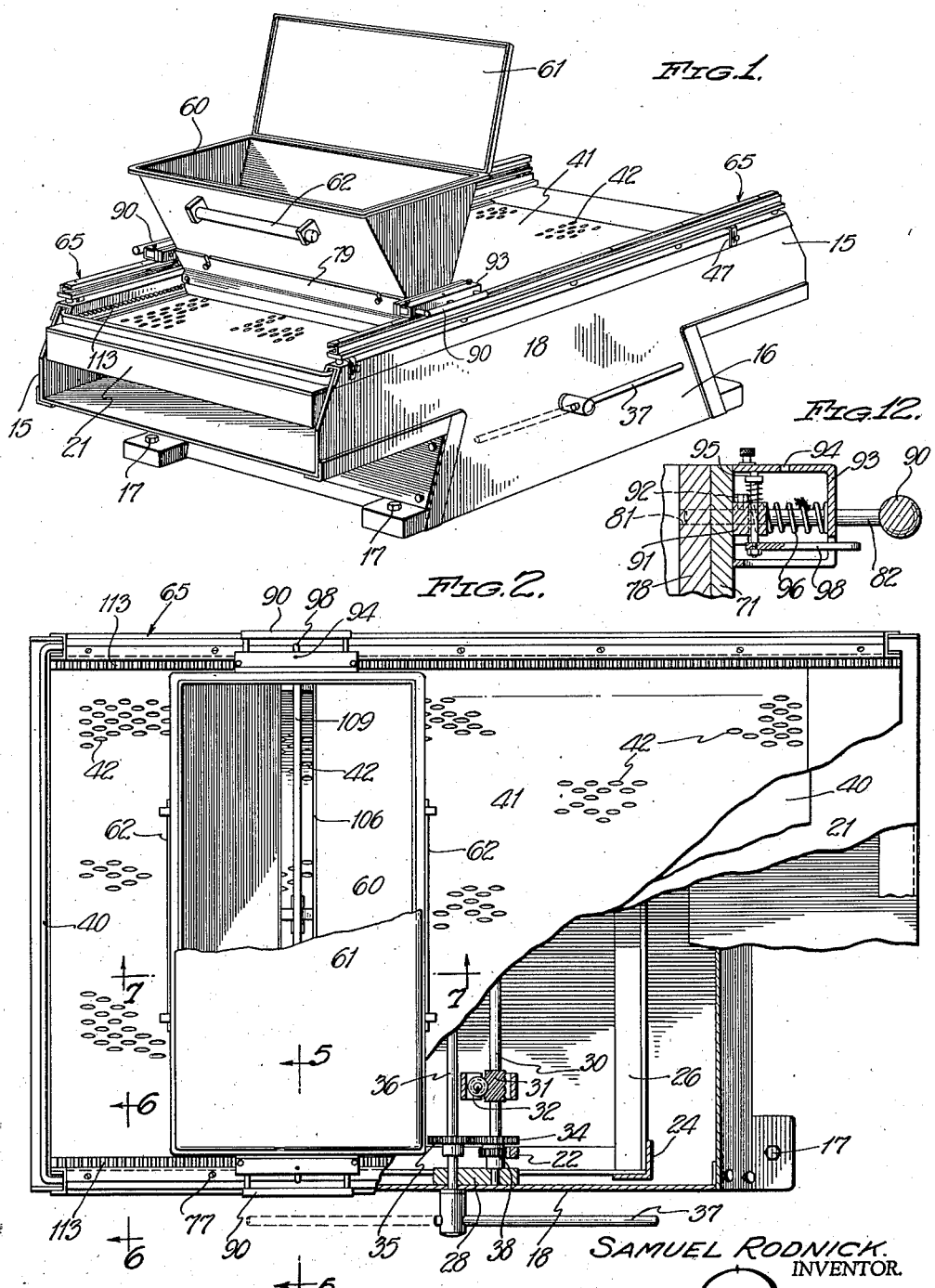
SAMUEL RODNICK.
INVENTOR.
BY Ely Pattison,
ATTORNEYS.

Jan. 4, 1938.  S. RODNICK  2,104,529
COOKY MACHINE
Filed Dec. 17, 1936  3 Sheets-Sheet 2
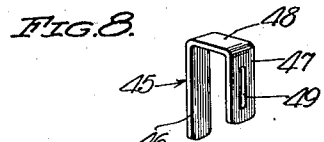
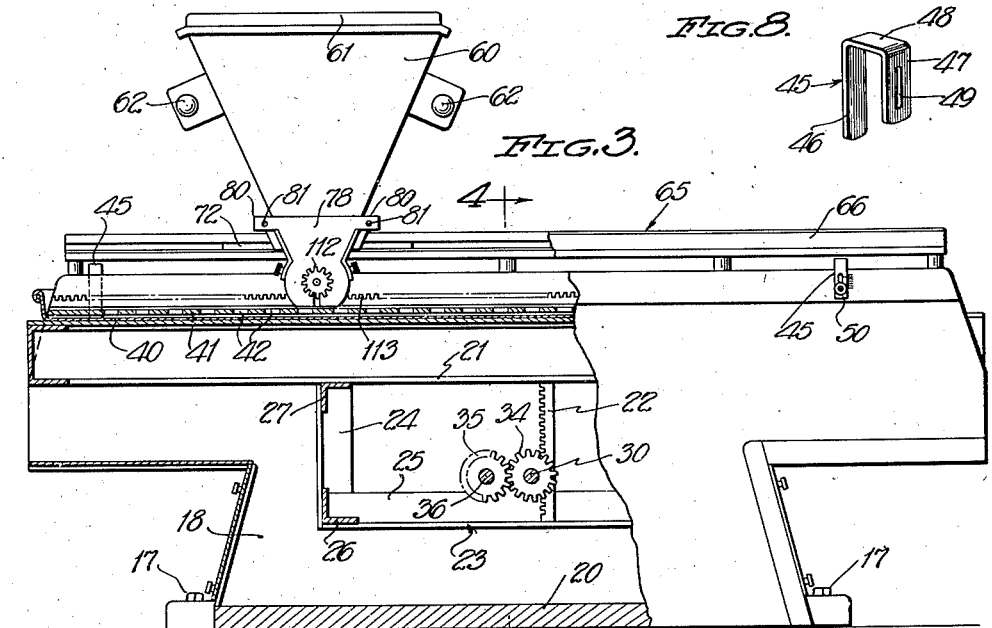
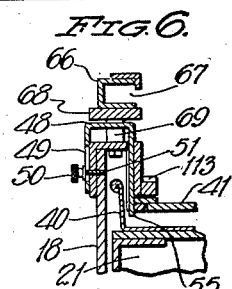
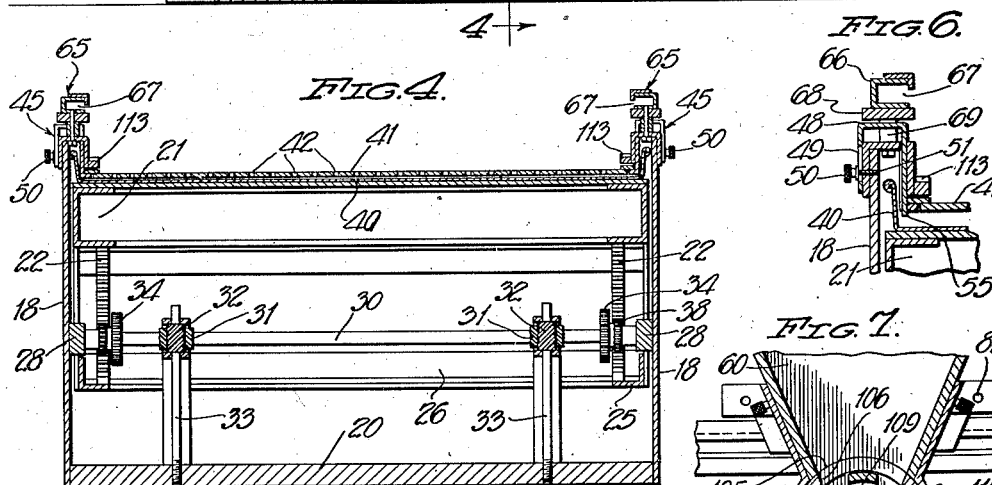
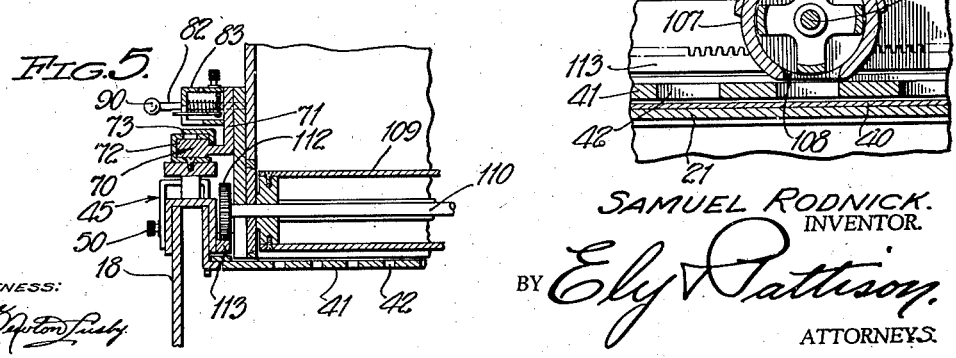
SAMUEL RODNICK.
INVENTOR.
BY Ely Pattison.
ATTORNEYS.

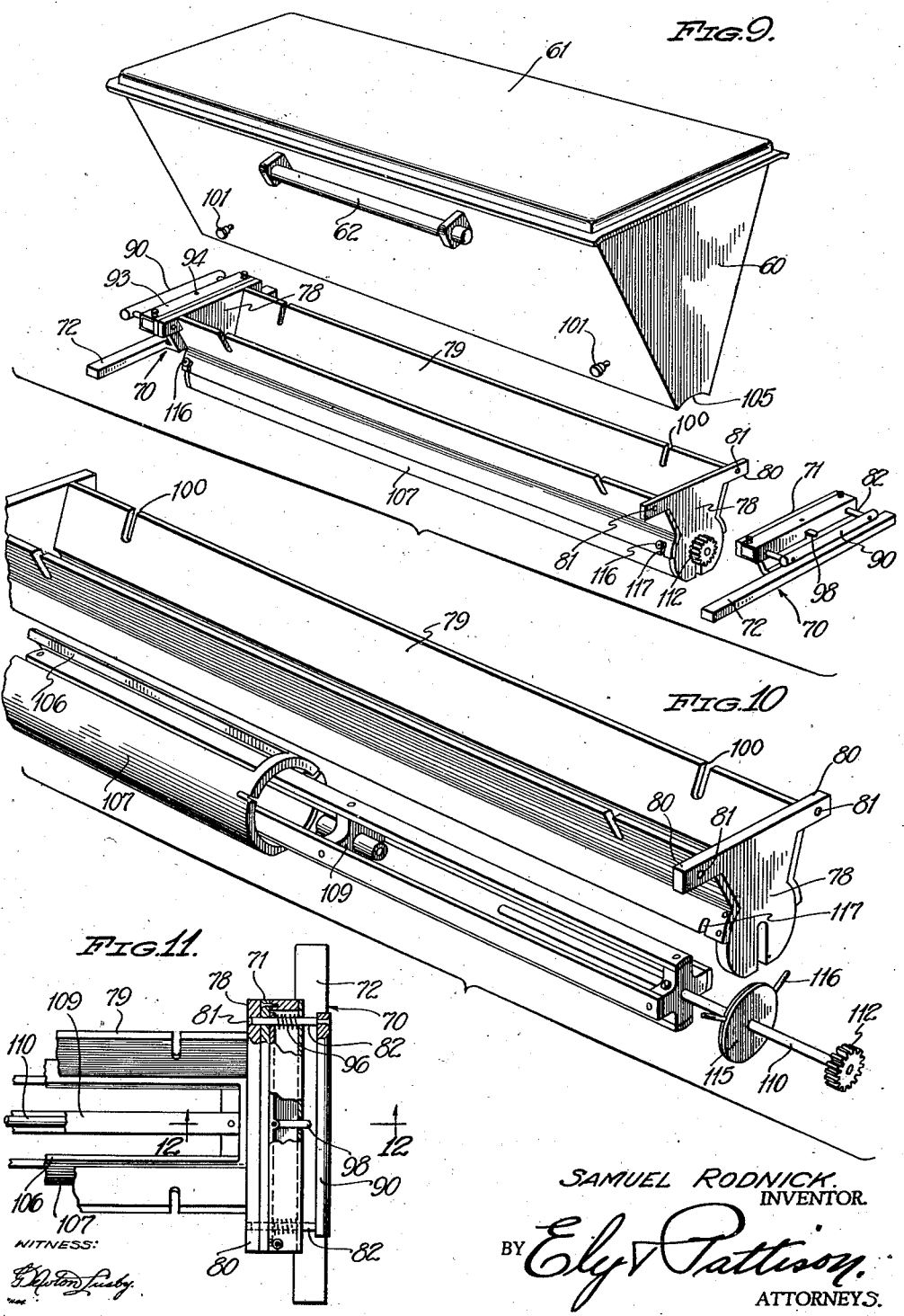

Patented Jan. 4, 1938

2,104,529

UNITED STATES PATENT OFFICE 2,104,529

COOKY MACHINE

Samuel Rodnick, New York, N. Y.

Application December 17, 1936, Serial No. 116,266

8 Claims. (Cl. 107—27)

This invention relates to new and useful improvements in dough molding machines and more particularly it pertains to machines for molding cooky dough.

One object of the present invention is to improve the construction and mode of operation of dough molding machines of the afore-mentioned type and to provide such machines with mechanism which will effect a better molding operation than prior machines.

A feature of the invention resides in a new and novel mechanism and arrangement of parts whereby the thickness to which the dough is deposited in a pan in which cookies are baked may be determined at the will of the operator.

A further feature of the invention resides in a new and novel construction and arrangement of parts whereby a plurality of batches of dough, each in itself sufficient to form a wafer-like body or cooky may be deposited in a baking pan at a single operation.

A still further feature of the invention resides in the provision of novel means for distributing the individual batches of dough in a baking pan.

Still a further feature of the invention resides in a novel construction of hopper from which the dough is discharged to the machine together with a novel dough discharging mechanism.

Still a further feature of the invention resides in a new and novel construction whereby the depositing of excess dough is obviated, the mechanism depositing only such dough as ultimately forms individual batches from which the cookies are baked.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings,

Figure 1 is a perspective view of a dough molding machine constructed in accordance with the present invention, Figure 2 is a top plan view thereof partly broken away, Figure 3 is a view partly in side elevation and partly in longitudinal section of the dough molding machine of the present invention, Figure 4 is a vertical transverse sectional view taken substantially on the line 4—4 of Figure 3, Figure 5 is a detail fragmentary sectional view taken substantially on the line 5—5 of Figure 2, Figure 6 is a fragmentary transverse sectional view on the line 6—6 of Figure 2, Figure 7 is a fragmentary transverse sectional view of the hopper taken substantially on the line 7—7 of Figure 2, Figure 8 is a detail perspective view of one of the elements employed to limit movement of the pan support of the machine, Figure 9 is a distended perspective view illustrating the manner in which the hopper is separable into two parts, Figure 10 is a distended perspective view partly in section showing the lower portion of the hopper and the dough discharging means, Figure 11 is a fragmentary plan view partly broken away illustrating the construction for removably securing the hopper in operative position upon the machine, and;

Figure 12 is a detail sectional view on an enlarged scale taken substantially on the line 12—12 of Figure 11.

A machine constructed in accordance with the present invention comprises a bed 15 supported upon a suitable base 16 which in turn may be secured to a bench table or other suitable support not shown by means of bolts, lag screws or the like 17. The bed portion comprises side plates 18 which are spaced from each other and which are maintained in operative position by being secured to the base member 20.

Mounted between the side plates and arranged for vertical movement therein, there is a frame-like member 21 and depending from said frame-like member upon opposite sides thereof, there are rack bars 22. The rack bars 22 are connected on their lower ends to a second frame-like member 23 which comprises vertical portions 24 and longitudinally extending members 25 connected by transversely extending members 26 and 27. It will thus be apparent that the upper frame 21 and the lower frame 23 are rigidly secured together and move in unison by a mechanism to be now described.

Mounted in bearing blocks 28 which are rigidly carried by the side plates 18 there is a shaft 30 and this shaft 30 carries two worm gears 31 which mesh with worm gears 32 carried by shafts 33 suitably secured in the base 20. The shaft 30 also carries two gears 34 which mesh with gears 35 carried by a shaft 36 which in turn is operated by a handle 37. Carried by the shaft 30 and meshing with the rack members 22, heretofore mentioned, there are two gears 38. The shaft 36 which is operated by the handle 37 is likewise mounted in the bearing blocks 28, heretofore mentioned.

From the foregoing it will be obvious that as the shaft 36 is rotated by means of the handle 37, the shaft 30 will be driven through the medium of the intermeshing gears 34 and 35 and through the medium of the gears 38 which mesh with the rack bars 22, both frames 21 and 23 will be either raised or lowered, depending upon the direction of rotation of the shaft 36 by the handle 37. The pitch of the spiral gears 31 and 32 is such that regardless of the position to which the frames 21 and 23 are moved, they will be maintained in this position by the intermeshing of the spiral gears and thus hold the frame in its adjusted position. However, it is to be understood that the spiral gears are so constructed as to permit of movement of the frames by the mechanism above described under the influence of the handle 37.

The upper frame 21, heretofore mentioned, constitutes a pan support and is adapted to support a baking pan 40 on the upper surface thereof.

The reference numeral 41 designates a die plate which is provided with a plurality of openings 42 through which the dough is passed onto a pan 40 carried by the upper frame 21. The spaced relation of the pan 40 and the die plate 41 determines the thickness of a batch of dough delivered by the openings 42 in the die plate, and means is provided to adjust or vary this spacing and consequently the thickness of the batches of dough deposited in the baking pan in order that cookies of various thickness may be formed. This means comprises substantially U-shaped stops 45, as illustrated in Figure 8. Each of these stops comprises two vertical legs 46 and 47 connected by a portion 48. The leg 47 has an elongated slot 49 therein, and as illustrated in Figure 6, this slot is adapted to receive a bolt 50 which is threaded as at 51 into the side wall 18 of the machine. It is to be understood that there are preferably four of these adjustable stops being arranged one at a point closely adjacent each corner of the machine. The leg 46 of each of these stops projects downwardly alongside of the die plate 41 designated at 55 in Figure 6.

By this construction it will be apparent that as the upper frame 21 is elevated in the manner heretofore described, the baking pan 40 will be elevated until it reaches the point where it engages the lower ends of the legs 46 of the adjustable stops 45, which engagement will arrest further vertical movement of the upper frame 21. Therefore, by adjusting these stops 45 the spaced relation of the pan 40 and the die plate 41 may be varied consequently varying the thickness of the batches of dough delivered through the openings 42 of the die plate and thereby determine the thickness of the finished product.

Means is provided to spread the dough over the die plate in order that it may pass through the openings 42 therein, and this means comprises a hopper 60. The hopper 60 has a cover 61 which is preferably hinged, as illustrated in Figure 1 and two operating handles 62. This hopper is mounted for sliding movement longitudinally of the machine to discharge cooky dough upon the die plate during such movement in order that the dough may pass through the openings 42 of the die plate.

To provide for sliding movement of the hopper 60 trackways 65 are provided. These trackways, as best illustrated in Figure 6, constitute channel members 66 having their open side 67 positioned inwardly of the machine. These trackways are carried by suitable supports 68 spaced with respect to the upper edge of the side plates 18 by supporting posts 69. The hopper 60 is supported by carriages 70 as shown in Figure 5. These carriages consist of angular members having vertical portions 71 and horizontal portions 72, the latter being received in the trackways 66. The carriages 71 are retained in position in the trackways by means of an angular member 73 which is carried by the trackways and removably attached thereto by bolts or the like 77.

The hopper comprises two members, an upper member in which the dough is carried and a lower member in which is mounted means for discharging the dough from the hopper.

By reference to Figures 9 and 10, it will be noted that the lower member comprises end walls 78 and side walls 79 suitably secured together. The end walls are held in spaced relation by the side walls 79 and said end walls have extensions 80 provided with perforations or openings 81. These openings 81 are adapted to receive spring bolts 82 carried in a housing 83 which in turn is mounted upon each of the carriages 70, heretofore mentioned. By moving these spring bolts 82 outwardly of their housing, the inner ends thereof will be disengaged with respect to the openings 81, heretofore mentioned, and leave the entire hopper free to be removed from the carriages 70.

As illustrated in Figure 9 there are two of these spring bolts at each end of the hopper and they are connected by means of a single operating handle 90 in order that they may be operated in unison. By reference to Figure 12 it will be noted that these bolts are also connected adjacent their inner ends by means of a bar 91 which is secured to the bolts by set screws or the like 92. The bolts are slidably mounted in the housing 93, the upper wall of which is provided with an opening 94. Carried by the bar 91 there is a spring pressed locking pin 95 which, when the bars are pulled outwardly of the housing 93 by the handle 90, engages in the opening 94 to hold the bolts 82 in their retracted position against the tension of a spring 96. When the bolts are retracted the hopper is free to be removed, as heretofore described. When it is desired to attach the hopper to the carriages the hopper is positioned and the locking pin 95 disengaged with respect to the opening 94 at each end of the hopper, whereupon the springs 96 will tend to force their respective bolts into engagement with the openings 81 in the extensions 80, heretofore mentioned. The locking pin 95 is released with respect to the opening 94 by means of a trigger-like member 98, the free end of which extends to a point adjacent the handle 90 in order that it may be depressed by means of the fingers of the hand grasping the handle 90.

From the foregoing it will be apparent that a hopper may be removed from or attached to the carriages at will.

The upper part of the hopper designated 60 is removable with respect to the lower part in order that the hopper and its several parts may be disassembled for the purpose of cleaning. To accomplish this the side walls 79 of the lower portion of the hopper are provided in their lower edges with slots 100 which receive bolts 101 carried by the side walls of the upper portion 60 of the hopper, which bolts, when tightened, will provide means for securing the two sections of the hopper together, it being understood that the side walls of the upper portion of the hopper are received within the side walls 79 of the lower portion of the hopper.

The lower portion of the hopper has a discharge outlet 105 which communicates with an opening 106 in a tubular member 107, and this tubular member has a discharge opening 108. Mounted within the tubular member 107 there is an agitator 109 which operates to take the dough from the hopper into the tubular member 107 and to discharge the dough through the opening 108 thereof. This agitator is adapted for rotation and to effect said rotation it is mounted upon a shaft 110, each end of which carries a gear 112. These gears 112 are adapted to mesh with rack bars 113, as illustrated in Figure 5, in such a manner that as the hopper is moved longitudinally of the bed of the machine in either direction, the agitator 109 will be rotated to take the dough from the hopper and discharge it through the discharge opening 108 of the tubular member 107. It is to be understood that the hopper is moved longitudinally of the machine by hand, the operator grasping either of the handles 62 for this purpose.

The tubular member, the agitator and the shaft 110 are retained in the lower portion of the hopper by means of bearing disks 115 carried by the shaft 110 and from which disks project angularly disposed threaded bolts 116 adapted to be received in slots 117 in the side walls 79 of the lower portion of the hopper.

From the foregoing it will be apparent that the present invention provides for the adjustment of a baking pan with respect to the die plate of a dough depositing mechanism in order that the thickness of the batches of dough deposited may be varied at will and that means is also provided whereby hoppers containing various types of dough may be readily removed and placed upon the machine at will.

This machine operates in the following manner. The dough being deposited in the hopper, and the adjustment of the members 45 made, the crank 37 is grasped and the pan supporting member moved vertically as described. In this vertical movement the pan will engage the lower ends of the legs 46 of the stops 45, thus limiting the vertical movement of the pan. The pan will be held in this position by reason of the inner engagement of the spiral gears 31 and 32 and with the pan is this position the hopper is moved from one end of the machine to the other depositing the dough upon the die plate through which it passes to the pan, depositing a full pan of cooky batches. After this operation has been completed the pan is removed and the operation repeated.

By this construction a single pan may be placed upon the pan support or a plurality of nested pans may be placed thereon and the pans removed from the pile as the dough is deposited thereon.

While the invention has been illustrated in its preferred form it is to be understood that it is not to be limited to the specific constructions and arrangements herein shown but may be practiced in other forms without departing from the spirit and scope thereof.

Having thus described the invention, what is claimed as new, is:

1. In a machine of the type described, a bed, a die plate supported upon the bed, a dough hopper supported upon the bed and movable over said die plate, a pan support underlying said die plate and movable vertically towards and away from the die plate, means for moving said pan support towards and away from the die plate, and means for limiting the movement of the die plate in its movement towards the die plate.

2. In a machine of the type described, a bed, a die plate supported upon the bed, a dough hopper supported upon the bed and movable over said die plate, a pan support underlying said die plate and movable vertically towards and away from the die plate, means for moving said pan support towards and away from said die plate, and means adjustably carried by the bed for limiting the movement of the pan support in the direction of the die plate.

3. In a machine of the type described, a bed, a die plate carried by said bed, a dough hopper movable over said die plate and arranged to discharge dough thereon, a pan support disposed beneath the die plate, and means for moving said pan support towards and away from said die plate.

4. In a machine of the type described, a bed, a die plate carried by said bed, a dough hopper movable over said die plate and arranged to discharge dough thereon, a pan support disposed beneath the die plate, and means for moving said pan support towards and away from said die plate, said last mentioned means including a pair of rack bars depending from the pan support, a shaft extending transversely of the bed, a pair of gears carried by the shaft and meshing with said racks, and means for rotating said shaft.

5. In a machine of the type described, a bed, a die plate carried by said bed, a dough hopper movable over said die plate and arranged to discharge dough thereon, a pan support disposed beneath the die plate, a pair of rack bars depending from the pan support, a shaft extending transversely of the machine, a pair of gears carried by said shaft and meshing with the aforementioned pair of rack bars, means for rotating said shaft to elevate the pan support, and means for limiting the movement of the pan support in the direction of the die plate.

6. In a machine of the type described, a bed, a die plate carried by said bed, a dough hopper movable over said die plate and arranged to discharge dough thereon, a pan support disposed beneath the die plate, a pair of rack bars depending from the pan support, a shaft extending transversely of the machine, a pair of gears carried by said shaft and meshing with the afore-mentioned pair of rack bars, means for rotating said shaft to elevate the pan support, and means carried by the bed and adapted for engagement with a pan on the pan support for limiting movement of the pan support in the direction of the die plate.

7. In a machine of the type described, a bed, a trackway extending longitudinally of the bed on each side thereof, a dough hopper, means for supporting said dough hopper on said trackways for movement longitudinally of the bed in either direction, a shaft extending longitudinally of said hopper and having its ends extended beyond the end walls of the hopper, a dough discharging means carried by said shaft, a gear carried by each of the projected ends of said shaft, and means for rotating said gears to effect a rotation of the shaft and dough discharging means upon each movement of the dough hopper longitudinally of the bed, said last mentioned means including a rack bar extending longitudinally of the bed upon each side thereof in position for meshing engagement with the gears carried by the shaft upon which the dough discharging means is mounted.

8. In a machine of the type described, a bed, a hopper supporting trackway extending longitudinally of the bed on each side thereof, a dough hopper suspended from said trackways, a rack bar extending longitudinally of the bed of the machine on each side thereof, said rack bars being disposed in a plane below their respective trackways, a shaft extending longitudinally of the dough hopper and having each of its ends extended beyond the ends of the dough hopper sufficiently to overlie said rack bars, gears on the ends of said shaft for engagement with the rack bars to rotate the shaft as the dough hopper is moved along the trackways, an agitator carried by said shaft, and means whereby the dough hopper may be moved along the trackways.

SAMUEL RODNICK.